May 28, 1940.   R. M. THOMPSON   2,202,239
PLUG TOP CLOSING MEMBER FOR FILTER PRESSES
Original Filed Jan. 10, 1933   3 Sheets-Sheet 1

INVENTOR.
Robert M. Thompson
BY
*[signature]*
ATTORNEY

May 28, 1940.　　　　R. M. THOMPSON　　　　2,202,239
PLUG TOP CLOSING MEMBER FOR FILTER PRESSES
Original Filed Jan. 10, 1933　　　3 Sheets-Sheet 2
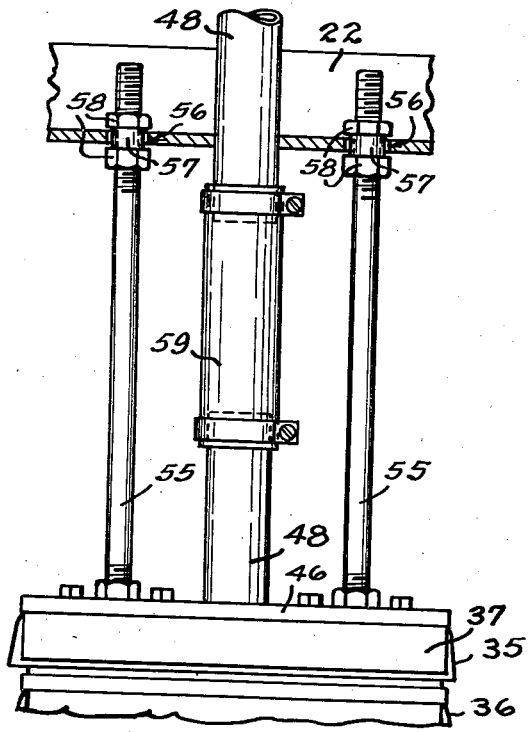
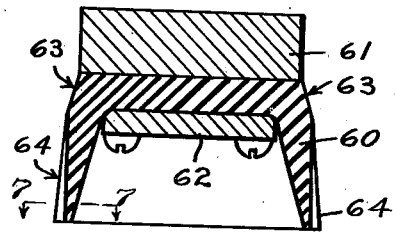
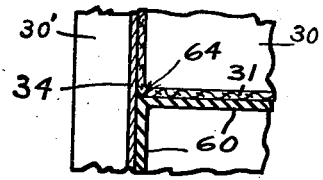
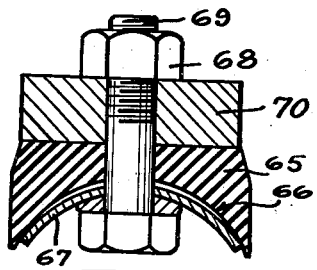
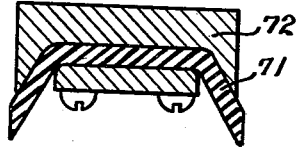
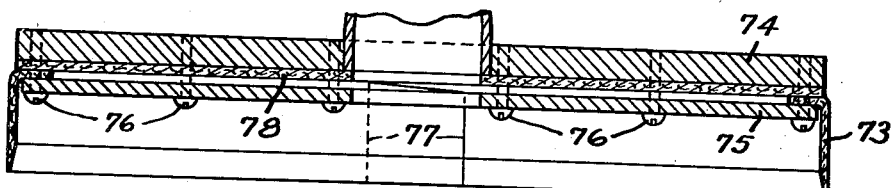
INVENTOR.
Robert M. Thompson
BY
Albright Arnold
ATTORNEY May 28, 1940.  R. M. THOMPSON  2,202,239
PLUG TOP CLOSING MEMBER FOR FILTER PRESSES
Original Filed Jan. 10, 1933    3 Sheets-Sheet 3
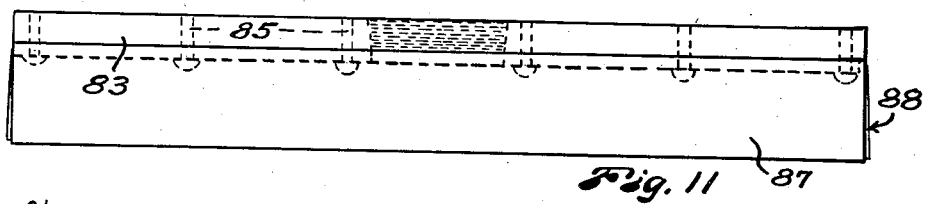
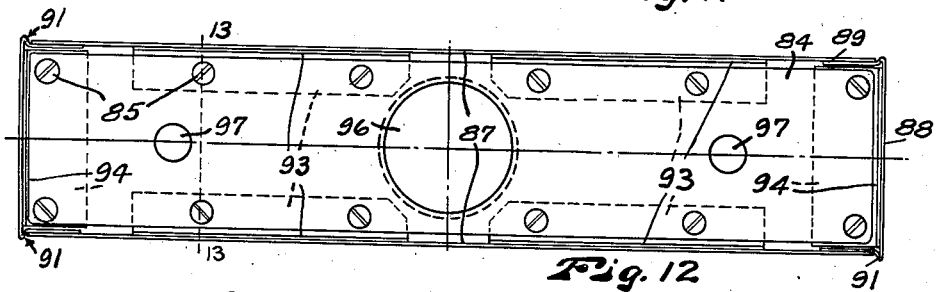
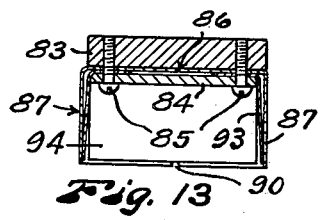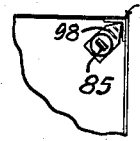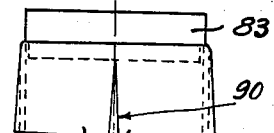
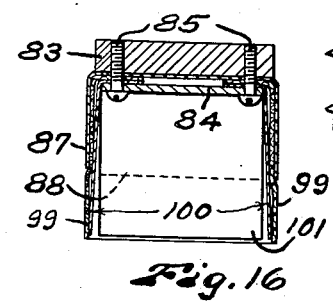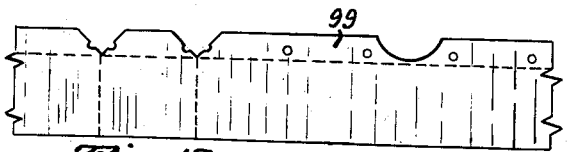
INVENTOR.
Robert M. Thompson
BY
ATTORNEY Patented May 28, 1940

2,202,239

UNITED STATES PATENT OFFICE 2,202,239

PLUG TOP CLOSING MEMBER FOR FILTER PRESSES

Robert M. Thompson, Seattle, Wash., assignor to Thompson Continuously Operating Filter Press Company, Seattle, Wash., a corporation of Washington Original application January 10, 1933, Serial No. 650,990. Divided and this application April 1, 1938, Serial No. 199,342

13 Claims. (Cl. 210—197)

My invention relates to the art of devices designed to separate fluids or liquids from other fluids or liquids of greater fluidity and fluids or liquids from solids.

My present invention is in the nature of a division of my application, Serial Number 650,990, filed January 10, 1933, Patent Number 2,112,869, issued April 5, 1938.

More particularly this invention relates to a plug top closing member for a filter press designed for continuous operation which is characterized by the development of extremely high pressures and practical and efficient operation. Particularly does my invention relate to simplifying and reducing the cost of the filtration or filtration step in the industrial arts, which step at present constitutes one of the expensive operations in manufacturing. The invention in general relates to the art of filtering or filtration disclosed in Patent Number 1,778,342 of United States of America, issued to me October 14, 1930, and in my application, Serial Number 509,595, now Patent No. 1,997,611.

It is common practice in the art of filtration to refer to devices designed for the separation of materials by the application of force or pressure to the materials from without, as "presses"; while devices designed for the separation of materials by having the force or pressure transmitted through the materials themselves as "filter presses." "Filter presses" are usually used where the amount of solids to be separated is but a small proportion of the total mobile mass composed of said solids and liquids in which said solids are disposed and hence the said materials are pumped into the filter press. "Presses" on the other hand, are used where the proportion of solid matter is normally much greater in relation to that of the liquid composing said materials to be filtered. The present invention relates to plug top closing members for the type of devices referred to as filter presses.

By rendering the filtering continuous, my filter press, employing a plug top closing member of the type herein disclosed, provides for utilizing the filter press principle with materials in which the solids are the predominate percentage of the material being treated. This is just the reverse of the common practice. Heretofore, the devices in common use for materials having only a small percentage of liquids, have been the press type rather than the filter press type. By providing for relatively excessively high pressures and fluid tight chambers and continuous discharge of cake in a filter press type of device, the machine embodying my invention herein set forth, has solved one of the difficult steps in manufacturing processes.

Another object of this invention is to provide an efficient plug top closing member of inverted cup shape adapted to be positioned between a plurality of moving belts to provide a liquid tight seal for one end of a filter chamber.

Other and more specific objects are to provide a plug top closing member having a metal guard on the exterior thereof positioned to contact moving filter belts and reduce friction; to provide plug top closing means including a plurality of cup like members positioned one above another; to provide plug top closing means comprising two or more cup like members flexibly connected together so that each one will be self centering within the filter chamber; to provide plug top closing members having corner seal means embodied therein and to provide an expansible metallic cup like plug type closing member.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Fig. 5 is an elevation, with parts in section showing a flexible means for supporting the packing plug between moving filter belts in such a manner as to insure an equal pressure of the plug against all filter belts.

Fig. 6 is a sectional view of a modified form of packing plug in which a molded rubber packing cup is used.

Fig. 7 is a fragmentary cross section as on broken line 7—7 of Fig. 6, showing the manner of molding the edges of said packing cup and showing fragments of a filter belt and impervious side belt in contact with said packing cup.

Fig. 8 is a sectional view of still another modified form of packing plug in which a resilient metal retainer is used within the concave portion of the packing plug for expanding the skirt portion of a packing plug against the belts.

Fig. 9 is a cross section of still another modified form of packing plug.

Fig. 10 is a detached longitudinal vertical cross section of a cup like plug top closing member constructed in accordance with this invention and employing a leather packing cup.

Fig. 11 is a detached side elevation of an expansible metal packing plug constructed in accordance with my invention.

Fig. 12 is a bottom plan view of the same.

Fig. 13 is a sectional view on broken line 13—13 of Fig. 12.

Fig. 14 is an end elevation of said metal packing plug.

Fig. 15 is a fragmentary plan view of a blank of metal from which the metal packing plug is made as it may appear after it is cut out and before it is bent to the final shape.

Fig. 16 illustrates, by a cross section view, a modified form of metal plug having a flexible fabric skirt preferably of moleskin used in connection therewith.

Fig. 17 is a fragmentary plan view of a piece of the fabric or moleskin used in Fig. 16.

Fig. 18 is a fragmentary bottom plan view of one corner of the metal packing plug illustrated in Figs. 11 to 17, showing corner holding devices inside of said plug.

Figure 1:
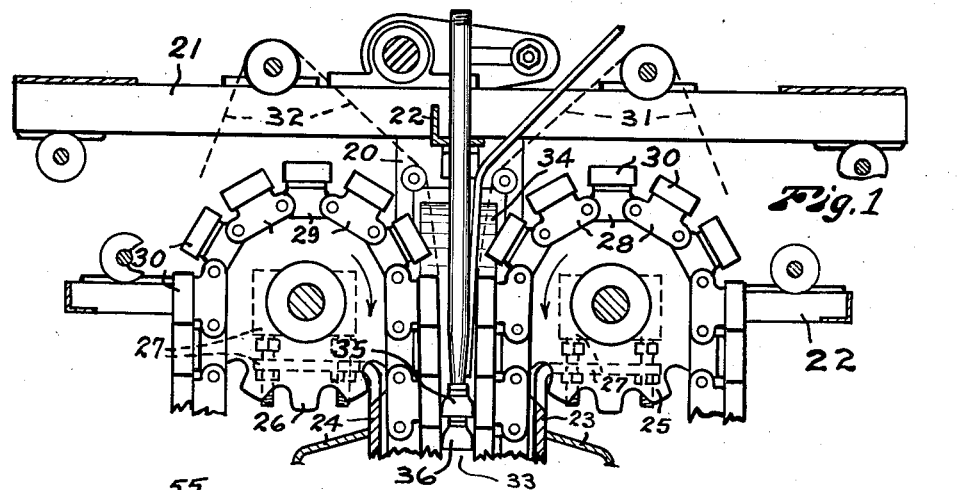
Figure 1 is a fragmentary view, partly in section and partly in elevation of the upper portion of a filter press constructed in accordance with this invention showing in end elevation a preferred form of plug top closing member operatively disposed within the filter press.
Figure 2:
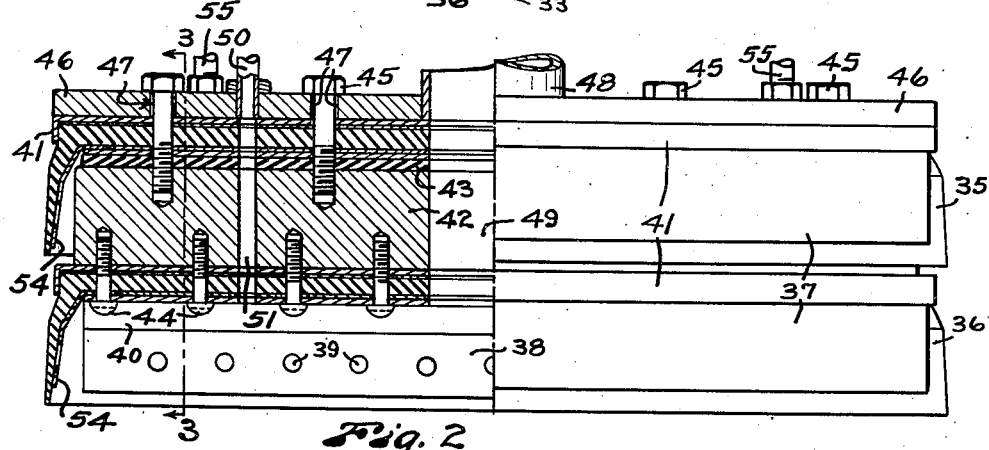
Fig. 2 is a detail view partly in elevation and partly in longitudinal section of a preferred form of multiple packing plug used in my machine.
Figure 4:
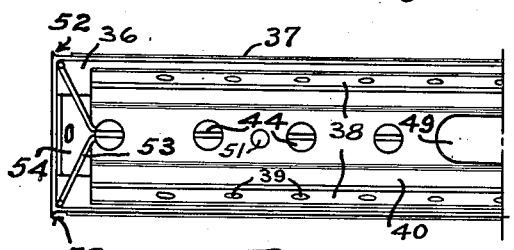
Fig. 4 is an inverted fragmentary plan view of one of the packing plugs shown in Figs. 2 and 3.
Figure 3:
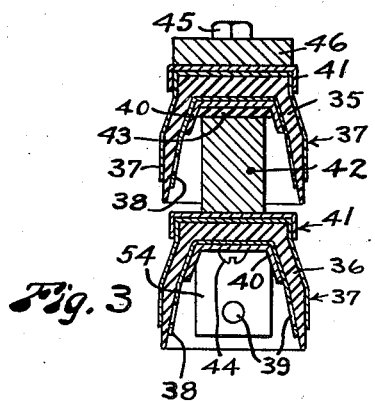
Fig. 3 is a cross section substantially on broken line 3—3 of Fig. 2.

Referring to Fig. 1, I show a fragmentary view of the upper portion of a filter press employing a plug top closing member constructed in accordance with this invention. In said Fig. 1 I show the upper portion of an upright frame member 20, which constitutes part of the support for overhead frame members 21 and 22. Two pendent frame members 23 and 24 of a form fully disclosed in the patent hereinbefore identified are supported with their upper end portions in substantially the positions shown in Fig. 1. Two sprocket wheels 25 and 26 are rotatably supported by bracket means 27, which extends upwardly from the respective pendent frame members. Two endless link belts 28 and 29 are operatively disposed on the sprocket wheels 25 and 26 and said link belts are provided with slats 30 which are disposed in edge to edge relation when the link belts are straightened out and form walls for the support of filter belts 31 and 32 shown by broken lines in Fig. 1. The link belts with the slats thereon are hereinafter termed slat belts. The filter belts are of material suitable to permit liquids to be expressed therethrough and the slats 30 are constructed so that the liquids forced out through the filter belts 31 can be taken off through the slats.

Preferably the filter belts 31 extend outwardly between the end portions of the slats 30 and metallic side members 34; one of which is shown in Fig. 7. These side members 34 form the closure means for the edges or ends of the filter chamber. The member 34 is preferably in the nature of an endless traveling belt of flexible metal which moves at the same speed as the slat belts and filter belts, although other types of moving closure means may be used for the ends of the filter chamber. The side members 34; herein shown are supported by traveling slat belt means 30'.

The link belts and filter belts are positioned with their inner laps spaced a short distance from each other to form therebetween a filter chamber 33 which is convergent from top to bottom. The link belts 28 and 29 are driven in the directions indicated by the arrows and the filter belts move in the same direction. When material containing liquid to be filtered out is introduced into the filter chamber 33 under pressure, it is necessary to provide some means for closing the upper end portion of this filter chamber 33 and sealing the same against the escape of liquid. The plug top closing members hereinafter described and which form the subject matter of this application, provide this closing and sealing means.

Referring to Figs. 1 to 5 inclusive, I show a double plug top closing member composed of an upper cup like rectangular member 35 and a lower cup like rectangular member 36, each formed of relatively resilient or flexible material, as rubber or like functioning material. Each of said cup like members has a piece 37 of very thin flexible material preferably metal having a low coefficient of friction fitted over the exterior thereof and another piece 38 of thin flexible material fitting within the inside thereof, said pieces 37 and 38 being respectively shaped to fit the external and the internal contour of the cup like members and extending substantially from one end to the other of the same, the outer piece 37 preferably terminating short of the lower edges of the cup like members. The innerpiece 38 may terminate short of the lower edges of the cup like members, or may extend to or below said lower edges of said cup like members, so as to function as internal supporting and expanding means for the cup like member 35 and 36. Perforations 39 may be provided in the inside flexible metal member 38 to allow internal pressure to act directly on said cup like members 35 and 36.

A non-flexible metal supporting member 40 is provided within each cup like member 35 and 36 and a non-flexible metal cap 41 is provided on the top of each of said cup like members. A metal spaced member 42 is provided between the two cup like members, said spacer member resting on the metal cap 41 of the lower cup like member and being separated from the internal metal supporting member 40 of the upper cup like member 35 by a resilient spacer strip 43. Screws 44 extend from the inside of the lower cup like member 36 upwardly through parts 40, 38, 36, 37 and 41 and are screwed into the spaced member 42 thus forming a means for securing these parts in assembled relation with the lower cup member 36 secured to the spacer member 42. In a like manner, cap screws 45 extend downwardly through a metal plate 46 on the top of the upper cup member 35 and through parts 41, 37, 35, 38, 40, and 43 and are threaded into the spacer member 42, thereby securing the several parts which are associated with the upper cup member in assembled relation and also securing the same to the spacer 42. The spacer member 42 thus serves as a means to which both the upper and lower cup like members 35 and 36 are secured and by which they are supported in spaced apart relation. The resilient strip 43 permits desirable flexibility between the spacer member 42 and the upper cup member, thereby affording an ample amount of automatic adjustment as to position between the upper and lower cup members 35 and 36 for most efficient operations. The holes in the metal plate 46, through which the cap screws 45 extend, are preferably slightly larger than the cap screws, as indicated at 47, to contribute to or permit this flexibility. The flexibility thus afforded between the two cup like members 35 and 36 allows these cup like members to conform more accurately to the belt surfaces with which they contact and to maintain a more nearly fluid tight seal. An upright tubular liquid inlet member 48 may be secured to the metal plate 46 and communicate with a passageway 49 which extends down through both cup members 35 and 36 and intermediate parts and affords a liquid tight connection between the tubular inlet member 48 and the pressure chamber 33, as shown in Fig. 1. A smaller tube 50 may be connected with the plate 46 and may communicate by a passageway 51 with the pressure chamber formed below the two cup members. This tube 50 may extend upwardly to a suitable location for any desirable purpose, as for instance, it may be connected with a relief valve or a pressure gauge, not shown, or it may be connected with both. The cup members 35 and 36 are preferably molded to the correct shape to fit the walls of the pressure chamber 33, which may be formed by the filter cloth members 31 and 32 and the metal belts 34 and said cup members are provided with protruding corners 52 which fit into the corners of the pressure chamber formed at the location where the filter cloths 31 and 32 make the right angle bend around the ends of the slats 30 and at the same time contact the metal side belts 34. The relationship of these parts, particularly the protruding corner, is illustrated in connection with the modified form shown in Fig. 7, wherein the protruding corner is numbered 64. For the purpose of holding the corners 52 out in the corners of the pressure chamber, I provide a forked spring 53, Fig. 4, formed of spring wire having a loop secured under the head of the end screw 44 and having forked portions which lie within and press against the corners of the resilient cups 35 and 36 and exert an outward pressure in said corners. A thin piece of resilient metal 54 is provided within the ends of the cups 35 and 36. The piece 54 may be in the nature of extensions on the ends of the thin inside metal pieces 38 and correspond in purpose and function to the parts 38.

The filter tight plug top closing member formed by the two cup members 35 and 36 is supported within the wider upper end of the pressure chamber in the position shown in Fig. 1 and forms a substantially filter tight contact with the moving walls of said pressure chamber which makes it possible to build up and maintain a relatively very high pressure within said chamber, so that a very dilute material, such as occurs in the manufacture of yeast, where the bodies or solids to be separated out are of microscopic dimension, will be held within a substantially fluid tight chamber. It will be noted that the said cup like members are narrower at the top and wider at the bottom, and that the lower portions of said cup like members are the parts which make a sealing contact with the moving filter cloths and belts, so that a sealing contact with low friction is afforded, said contact being like the contact made by a cup packing in a pump. Obviously, the upper cup like member 35 will be somewhat larger than the lower cup like member 36 to conform to the convergence of the filter chamber.

The cup like members 35 and 36 are supported preferably by two rods 55, Fig. 5, which are secured to the metal top plate 46 and extend upwardly and are connected with the transverse angle bar 22 at the top of the frame. To permit floating adjustment of the plugs I preferably allow a limited amount of gyratory movement of the two rods 55 where they connect with the angle bar 22. This may be done by providing relatively large holes 56 in the angle bar 22 and by providing, on the rods 55, nipples 57 of somewhat smaller diameter than the holes 56 and positioned within said holes. The length of the nipples 57 is greater than the thickness of the flange of the angle bar 22 through which they extend and the rods 55 have nuts 58 thereon, arranged to screw tightly against both ends of the nipples, whereby the rods 55 will be loosely and flexibly connected with the angle bar 22, thereby allowing for floating movement of the two cup like members 35 and 36, whereby said two cup like members will assume the correct position relative to the moving filter cloths and metal belts with which they contact, thereby assuring a tight and conforming fit.

The conduit member 48, Fig. 5, may also extend through the angle bar 22 and is preferably provided with a flexible section 59, as shown in Fig. 5, to afford floating movement to the plug members.

In operation, the providing of an efficient plug has proven one of the very difficult problems. Care must be taken to confine or maintain an excess of the hydrostatic pressure of the material being treated upon the inner walls of the cup like plug members in order that a fluid seal may be assured. The plug construction above set forth has been found to meet the problem arising in the environment of heavy pressures and moving belts, even as occurs in handling materials where the solid part is of microscopic dimensions, for example, yeast, in the filtering process of which hydrostatic pressures in excess of one hundred pounds per square inch are used. It must be remembered that the filter cloth often is a member of relatively delicate construction and undue friction thereon must be avoided to prevent undue wear where relatively high pressures are involved. Gradually after continued operation, some of the solid parts of the material being treated, find their way past the lower cup and lodge in the recess between the lower and upper cup, forming a mass in said recess. This mass helps in establishing the seal. The structure herein thus takes advantage of providing for utilizing a mass of the material being treated above the lower plug to assist in forming the seal.

In Figs. 6 and 7 I have shown a modified form of plug top closing member embodying a flexible cup member 60 secured between supports 61 and 62. The upper portions of the cup member 60 are beveled off as at 63 to avoid injury by the belts and filter cloths which move downwardly past the cup member. The corners of said cup member protrude outwardly as shown at 64 in Fig. 7 to thereby prevent leakage between the metal side belts 34 and filter cloths 31 and 32 at the location where the edges of the filter cloths fold around the ends of the slats 30, it being understood that the portions extending around the ends of the slats may be integral with the filter belts 31 and 32 as shown in Fig. 7.

Fig. 8 shows a plug top closing member embodying a cup member 65 having a concave bottom 66 within which is a flexible retainer member 67 of curved cross section arranged to bear near the outer depending edge portions of the cup member 65, whereby tightening of a nut 68 on a bolt 69, which extends through the retainer member 67 and cup member 65 and through a plate member 70 will press the lower portions of said cup member more firmly out against the filter cloths and metal side belts 34 with which it is adapted to contact. More than one bolt 69 may be provided in connection with each cup member 65 if desired. This structure also may apply to the ends as well as to the sides of the plug member 65.

In Fig. 9 I have shown another plug top closing member in which the sides of the flexible cup portion 71 are flared and the sides of the cap member 72 extend down over the flared sides of the cup member 71 so that only the lower portions of the cup member 71 come in contact with the filter cloths and metal side belts.

Fig. 10 shows still another modified form of plug top closing member in which the upper edges of a cup member 73, which may be formed of pliable material, as leather, are secured between a cap 74, and an internal retainer 75, said cap and retainer being connected by screws 76. In this construction the material of which the cup member 73 is formed is preferably lapped and sewed at both sides, as indicated at 77, and a strip 78 is preferably placed between the edges of the cup member 73 and the cap 74. In a general way, the operation of this plug top closing member is similar to the operation of the previously described plug members. The character of the material of which the plug top closing member is formed will, of course, be governed by the character of the material being separated, so that destructive chemical interaction therebetween will be avoided. Also, the particular form of the plug top closing member to be used will depend upon the character of the material to be separated and the hydrostatic pressures to be retained.

In Figs. 11 to 15, I have shown a plug member which may be formed entirely of metal. In these figures 83 is a metal cap, 84 is a retainer member secured to the cap 83 by screws 85. The sides and ends of the cup member proper are formed of a piece of thin sheet metal blanked out in substantially the shape shown in Fig. 15, in which Fig. 15 one end is broken away, it being understood that the two ends are duplicates. In this Fig. 15, the dotted lines indicate the lines along which bends are made to form a base portion 86, side members 87, end members 88 and corner portions 89, which corner portions 89 later fold inside of the side portions 87. The end portions 88 are slotted from the outer edge inwardly as at 90 to afford greater flexibility to the side members and the corners are bent and crimped as at 91 to more snugly fit within the corners of the pressure chamber at the locations where the edges of the filter cloth folds around the ends of the slats. The portions 89 are cut loose from the side portions 87 along lines 92. In forming the cup element, the corner portions 89 are first bent at substantially right angles to the end portions 88 and the lines of these bends are shaped or crimped to form the protruding corners 91. The ends 88 and sides 87 are then bent in the same direction at substantially right angles to the body portion 86, thus forming a cup like element with the corner portions 89 positioned inside of the side walls 87. Flat spring elements 93 are provided at the sides and corresponding flat spring elements 94 are provided at the ends to exert a yielding outward pressure on the thin metal sides and ends of the metal cup element. The flat spring elements 94 at the ends also form closure means for the slots 90. The flat spring elements 93 and 94 have base flanges bent at right angles thereto, said base flanges together with the base portion 86 of the thin metal cup element being securely clamped between the retainer 84 and 83. An opening 96 is provided in the center of the cap 83 for the reception of a pressure inlet conduit which may be of the form shown in Figs. 1 and 5, and other openings 97 are provided for the reception of suitable plug supporting rods, not shown, but which are similar to the rods 55 shown in Fig. 5. In Fig. 18 I have shown a resilient clip 98 which may be held by one of screws 85 and placed in the corners of the cup element to press said corners out snugly into the corner portions of the pressure chamber. This clip 98 functions similarly to the clip 73 shown in Fig. 4, and may extend substantially throughout the entire depth of the cup. The slot 90 makes it possible to press the corners 91 outwardly by means of the clip 98.

The structure shown in Figs. 17 and 18 is substantially the same as that shown in Figs. 11 to 15, inclusive, except that a fabric member 99, preferably of moleskin cloth, is provided just inside of the side and end members 87 and 88, said moleskin being of greater depth than the side and end members 87 and 88, and extending below the same so that the moleskin will come in contact with the filter cloth and metal side belts below the edges of the side and end members 87 and 88. In this construction, side spring members 100 and end spring members 101 of a width substantially equal to the width of the moleskin are provided to resiliently hold said moleskin member outwardly. The particular characteristics of moleskin cloth make it suitable for the purpose just described. In moleskin cloth the threads on one side all extend in the same direction and the moleskin is applied to the plug with the threads extending in the direction of movement of the parts with which the plug contacts, thus reducing friction and wear to a minimum for a structure of this type.

In operation, any of the plug top closing members herein disclosed may be positioned between the moving filter belts in the manner illustrated in Fig. 1 to form a liquid tight end closure member for the filter chamber through which any material capable of being pumped may be introduced under pressure into the filter chamber. The plug top closing members thus form a liquid tight seal with the moving filter belts.

Obviously, changes may be made in the forms, dimensions and arrangement of the parts of my invention, without departing from the principle thereof, the above setting forth only preferred forms of embodiment.

I claim:

1. The combination, of a filter chamber formed by a plurality of side walls, at least two of which comprise traveling belt means and which chamber is provided with filtrate openings through a side wall, with a plug end closing and sealing member for said filter chamber embodying a cup like molded packing member contacting the said side walls of the filter chamber and forming a seal at an end of the filter chamber, and a resilient metal friction guard extending toward and over the sides of said packing member and terminating short of the portions of said packing member which contact said side walls of the filter chamber, whereby a substantially filter tight closure resistant to relatively high fluid pressures is provided at an end of the filter chamber.

2. The combination, of a filter chamber formed by a plurality of side walls, at least two of which comprise traveling belt means and which chamber is provided with filtrate openings through a side wall, with a plug end closing and sealing member for said filter chamber embodying a cup like molded packing member contacting said side walls of the filter chamber and forming a seal at an end of the filter chamber, a resilient metal friction guard extending toward and over the sides of said packing member and terminating short of the portions of said packing member which contact said side walls of the filter chamber, and a resilient metal expanding member bearing against the inner walls of said packing member, whereby a substantially filter tight closure resistant to relatively high fluid pressures is provided at an end of the filter chamber.

3. The combination, of a filter chamber formed by a plurality of side walls, at least two of which comprise traveling belt means and which chamber is provided with filtrate openings through a side wall, with a plug end closing and sealing member for said filter chamber; another plug end closing and sealing member for said filter chamber, both of said plug end closing and sealing members contacting said side walls of the filter chamber and forming a seal at an end of the filter chamber; and flexible connector means connecting said two plug end closing members, whereby flexibility is provided between said plug end closing members for self centering said other plug end closing member.

4. The combination, of a filter chamber formed by a plurality of side walls, at least two of which comprise traveling belt means and which chamber is provided with filtrate openings through a side wall, with a plug end closing and sealing member for said filter chamber; flexible mounting means supporting said plug end closing member; another plug end closing and sealing member for said filter chamber, both of said plug end closing and sealing members contacting said side walls of the filter chamber and forming a seal at an end of the filter chamber; and flexible connector means connecting said two plug end closing members, whereby said plug end closing members are self centering with respect to said filter chamber.

5. The combination, of a filter chamber formed by a plurality of side walls, at least two of which comprise traveling belt means and which chamber is provided with filtrate openings through a side wall, with a plug end closing and sealing member for said filter chamber embodying a relatively heavy mounting plate; a resilient metal friction guard; a cup like packing member within said friction guard; a resilient metal expanding member bearing against the inner walls of said packing member; a resilient mounting plate disposed on said resilient metal expanding member; a rigid block spacer bearing against said resilient mounting plate flexibly connected with said relatively heavy mounting plate; and a second plug end closing member connected with said rigid block spacer.

6. The combination, of a filter chamber of rectangular shape in cross section formed by four side walls, at least two of which comprise traveling belt means and which chamber is provided with filtrate openings through a side wall, with a plug end closing and sealing member for said filter chamber embodying a cup like packing member having four sides respectively contacting the said side walls of the filter chamber and with said plug end closing member forming a seal at an end of the filter chamber; and protruding portions disposed on the corners of the cup like packing member for sealing the corners of the filter chamber.

7. The combination, of a filter chamber of rectangular shape in cross section formed by four side walls, at least two of which comprise traveling belt means and which chamber is provided with filtrate openings through a side wall, with a plug end closing and sealing member for said filter chamber embodying a cup like packing member having four sides respectively contacting the said side walls of the filter chamber and with said plug end closing member forming a seal at an end of the filter chamber; protruding portions disposed on the corners of the cup like packing member for sealing the corners of the filter chamber; and means resiliently urging outwardly each of said protruding portions.

8. The combination, of a filter chamber of rectangular shape in cross section formed by four side walls, at least two of which comprise traveling belt means and which chamber is provided with filtrate openings through a side wall, with a plug end closing and sealing member for said filter chamber embodying an expansible cup like metallic packing member having four side walls contacting the said side walls of the filter chamber and with said plug and closing member forming a seal at an end of the filter chamber, said cup like metallic packing member being characterized by having integral corners and expansion slits in the side walls intermediate the corners; and metallic seal members disposed back of, resiliently urged against, and covering said expansion slits.

9. The combination, of a filter chamber of rectangular shape in cross section formed by four side walls, at least two of which comprise traveling belt means and which chamber is provided with filtrate openings through a side wall, with a plug end closing and sealing member for said filter chamber embodying an expansible cup like member having four side walls contacting the said side walls of the filter chamber and with said plug end closing member forming a seal at an end of the filter chamber, said cup like member being characterized by having integral corners and expansion slits in the side walls intermediate the corners; seal members disposed back of, resiliently urged against, and covering said expansion slits; and means resiliently urging outwardly each of said corners.

10. The combination, of a filter chamber formed by a plurality of side walls, at least two of which comprise traveling belt means and which chamber is provided with filtrate openings through a side wall, with a plug end closing and sealing member for said filter chamber embodying a cup like molded packing member contacting the said side walls of the filter chamber and forming a seal at an end of the filter chamber, the inner side of said packing member being concave; a rigid back plate for said packing member; a plate on the concave side of said packing member exerting a yielding outward pressure thereon; and an adjustable holding means connected with said plate and extending through said back plate and to the exterior of said filter chamber, whereby the pressure of said plate against said plug may be adjusted from the exterior of said filter chamber.

11. The combination, of a filter chamber formed by four side walls, at least two of which comprise traveling belt means and which chamber is provided with filtrate openings through a side wall, with a plug end closing member for said filter chamber embodying a cup like member having four side walls contacting respectively the said side walls of the filter chamber; a rigid back plate for said cup like member; an expansion plate within the cup like member; and adjustable holding means connected between said expansion plate and said back plate, whereby the side walls of the cup like member may be adjusted relative to the side walls of the filter chamber.

12. The combination, of a filter chamber formed by a plurality of side walls, at least two of which comprise traveling belt means and which chamber is provided with filtrate openings through a side wall, with a plug end closing and sealing member for said filter chamber embodying a packing member contacting the said side walls of the filter chamber and forming a seal at an end of the filter chamber; and means floatingly supporting said plug end closing member for self-centering the plug end closing and sealing member relative to the said side walls of said filter chamber.

13. The combination, of a filter chamber formed by a plurality of side walls, at least two of which comprise traveling belt means and which chamber is provided with filtrate openings through a side wall, with a plug end closing and sealing member for said filter chamber embodying a rigid back plate; a facing of soft material on the underside of said back plate; a cup leather contacting the said side walls of the filter chamber and having an inturned edge portion positioned against said facing; a rigid internal retainer member positioned within said cup leather and overlapping the inturned edge portion thereof; and means securing said internal retainer member to said back plate securely clamping said inturned edge portion of said cup leather.

ROBERT M. THOMPSON.